United States Patent [19]

Kawamura et al.

[11] Patent Number: 5,734,480
[45] Date of Patent: Mar. 31, 1998

[54] RECORDING APPARATUS CAPABLE OF SORTING IMAGE RECORDED SHEETS

[75] Inventors: Wataru Kawamura, Zama; Takekazu Kumagai, Tokyo, both of Japan

[73] Assignee: Canon Kabushiki Kaisha, Tokyo, Japan

[21] Appl. No.: 541,098

[22] Filed: Oct. 11, 1995

[30] Foreign Application Priority Data

Oct. 13, 1994 [JP] Japan .................. 6-247867
Nov. 29, 1994 [JP] Japan .................. 6-319136
Oct. 4, 1995 [JP] Japan .................. 7-257640

[51] Int. Cl.⁶ .................. H04N 1/21; H04N 1/40; G03G 21/00; B65H 39/10
[52] U.S. Cl. .................. 358/296; 358/444; 399/9; 399/23; 399/83; 399/403; 399/404; 271/290; 271/298
[58] Field of Search .................. 358/296, 300, 358/400, 401, 402, 434-439, 444, 468, 498; 399/9, 18, 19, 21, 23, 38, 75, 83, 361, 381, 397, 403, 404, 405; 271/287, 288, 290, 292, 298

[56] References Cited

U.S. PATENT DOCUMENTS

| | | | |
|---|---|---|---|
| 4,970,544 | 11/1990 | Furusawa et al. | 399/361 |
| 5,105,283 | 4/1992 | Forest et al. | 358/444 X |
| 5,390,910 | 2/1995 | Mandel et al. | 271/296 |
| 5,535,012 | 7/1996 | Matsumoto et al. | 358/498 X |
| 5,543,893 | 8/1996 | Sheldon et al. | 358/498 X |
| 5,580,045 | 12/1996 | Matsumoto et al. | 271/298 |

*Primary Examiner*—Eric Frahm
*Attorney, Agent, or Firm*—Fitzpatrick, Cella, Harper & Scinto

[57] ABSTRACT

An image recording apparatus includes a printer for recording a received image on a sheet, a sorter for sorting the sheet by stacking the sheet recorded by the printer in one of a plurality of bins, a determination unit for determining a bin in which the sheet is to be stacked, a discrimination unit for discriminating if the sheet can be stacked in the determined bin, a memory for storing the received image when the discrimination unit discriminates that the bin determined by the determination unit cannot stack the sheet, and a second memory for storing bin information indicating the bin determined by the determination unit in correspondence with the image stored in the memory.

26 Claims, 12 Drawing Sheets

FIG. 13

| BIN DESIGNATION TABLE | | |
|---|---|---|
| BIN | COMMUNICATION PARTNER'S TELEPHONE NUMBER (1) | COMMUNICATION PARTNER'S TELEPHONE NUMBER (2) |
| 4b1 | 03 - 5482 - 7338 | 03 - 5482 - 7339 |
| 4b2 | 03 - 5482 - 7201 | 03 - 5482 - 7201 |
| 4b3 | 03 - 5482 - 7276 | |
| 4b4 | 03 - 3335 - 9119 | |
| 4b5 | | |

5,734,480

RECORDING APPARATUS CAPABLE OF SORTING IMAGE RECORDED SHEETS

BACKGROUND OF THE INVENTION

1. Field of the Invention

The present invention relates to a recording apparatus which records images on sheets, and can sort the sheets.

2. Related Background Art

A system in which a sorter is connected to a facsimile apparatus, and bins of the sorter to receive recorded sheets are determined in correspondence with predetermined conditions to sort the recorded sheets has been proposed.

However, the proposed system does not consider processing to be executed when the bins are full of sheets or when no recording sheets remain, and problems such as paper jam in the sorter and occurrence of an unrecorded state of received images are expected.

SUMMARY OF THE INVENTION

It is an object of the present invention to provide a recording apparatus which can solve the above-mentioned problems.

It is another object of the present invention to provide a recording apparatus which can store images depending on the state of stacking means for sorting and stacking sheets, and can recover a sorting operation later.

It is still another object of the present invention to provide a recording apparatus which can store images in correspondence with the presence/absence of unrecorded sheets, and can recover a sorting operation later.

It is still another object of the present invention to provide a recording apparatus which can avoid an idle time upon recovery.

The above and other features of the present invention will become apparent from the following description of the preferred embodiments taken in conjunction with the accompanying drawings.

BRIEF DESCRIPTION OF THE DRAWINGS

FIG. 13 is an explanatory view showing a bin designation table.

DETAILED DESCRIPTION OF THE PREFERRED EMBODIMENTS

The preferred embodiments of the present invention will be described in detail below with reference to the accompanying drawings.

Figure 1:
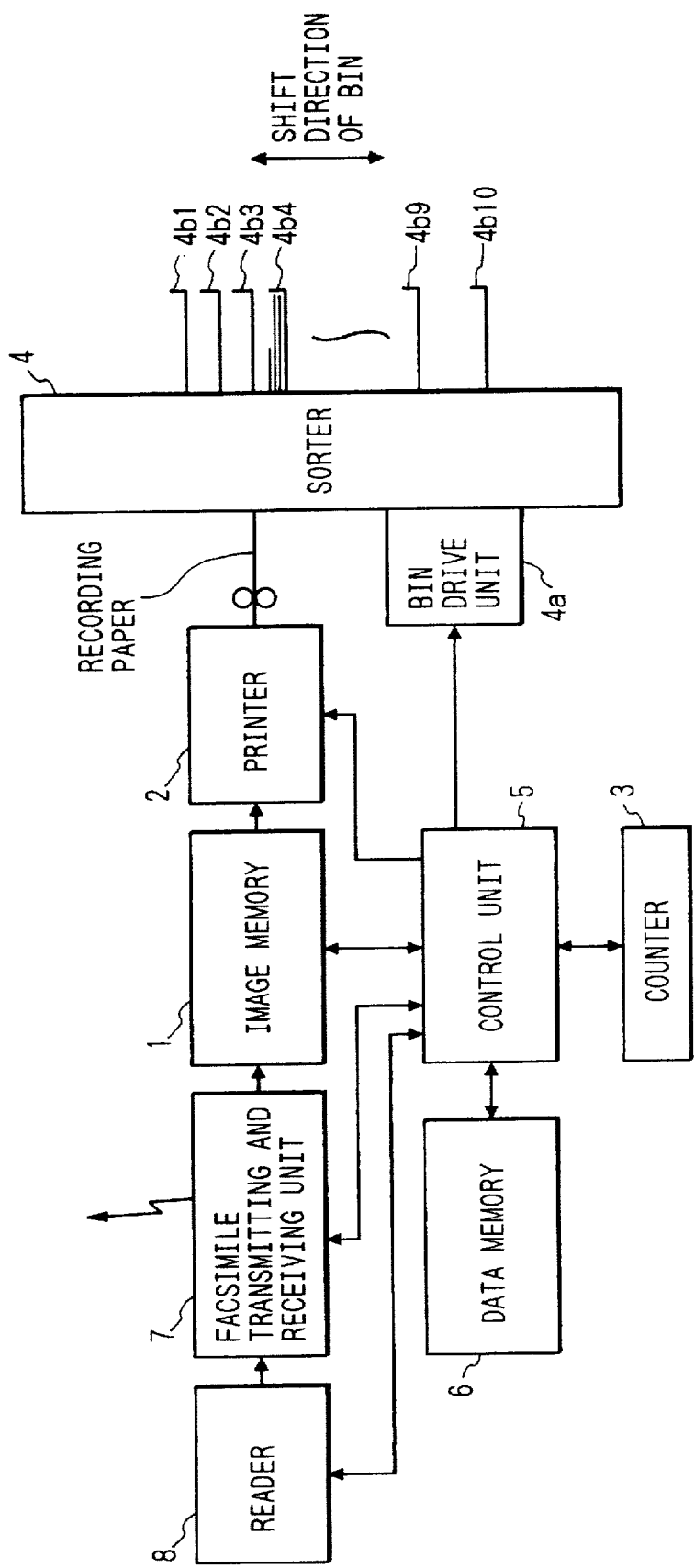
FIG. 1 is a block diagram of a facsimile apparatus having a sorter according to an embodiment of the present invention.

FIG. 1 is a block diagram showing the arrangement of a principal part of a facsimile apparatus to which the present invention is applied. The facsimile apparatus shown in FIG. 1 comprises an image memory 1 for storing received image data received in a facsimile communication, a printer 2 for recording a received image stored in the image memory 1, a counter 3 for counting the number of recorded sheets for one communication, a sorter 4 for stacking recorded sheets printed out by the printer 2, a control unit 5 for controlling the respective units, and a data memory 6 for storing data for the control unit 5. The apparatus also comprises a facsimile transmitting and receiving unit 7 for performing a facsimile transmission and a facsimile reception, and a reader 8 for reading an original image to be facsimile-transmitted.

The arrangement of the sorter 4 will be described below. The sorter 4 has 10 bins $4b1$ to $4b10$, and can shift the bins in the vertical direction by a bin drive unit $4a$ to stack recorded sheets output from the printer 2 in one of the 10 bins. The number of stackable sheets of the 10th bin $4b10$ is larger than that of each of the remaining nine bins $4b1$ to $4b9$, and the bin $4b10$ can stack a maximum number of recording sheets that can be set in the printer 2.

A control operation upon facsimile reception will be described below. Image data recorded in one communication are stored in the image memory 1, and the number of recorded sheets at that time is counted by the counter 3.

Upon completion of the communication, the control unit 5 reads the count value of the counter 3, determines a bin $4bN$ (N=1 to 10) which is to stack recording sheets on which the received image data are recorded, and controls the bin drive unit $4a$ to shift the determined bin $4bN$ to the recording sheet delivery position of the printer 2.

Under the control of the control unit 5, the image data stored in the image memory 1 are printed out by the printer 2, and recording sheets for one communication are stacked in the bin $4bN$. A maximum number of stackable sheets of each bin and the number of sheets actually stacked in each bin (to be referred to as the number of stacked sheets hereinafter) are stored in the data memory 6 by the control unit 5.

Figure 2:
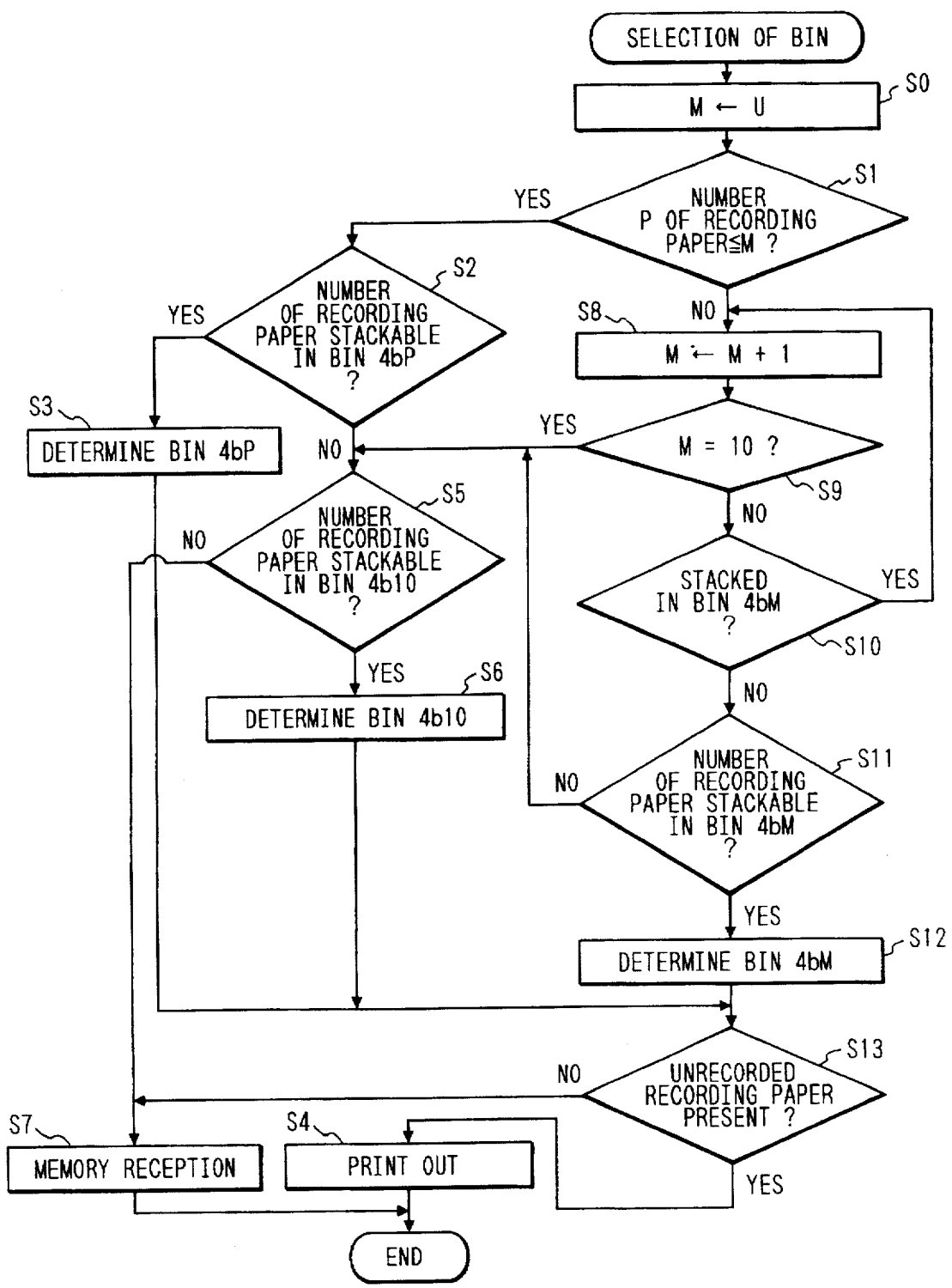
FIG. 2 is a flowchart showing the selection sequence of bins.

A method of selecting a bin will be described below. FIG. 2 is a flowchart showing the selection sequence of a bin by the control unit 5. This processing is executed after received image data are stored in the image memory 1. In step S0 (the word "step" will be omitted in the following description), a user determined value U (to be described later) is set in a variable M. In S1, the number, P, of recording sheets for one communication stored in the image memory 1 is compared with M. If P≦M, the flow advances to S2. In S2, the number of stacked sheets of a bin 4bP (P=1 to M) and the maximum number of stackable sheets, which numbers are stored in the data memory 6, are compared with each other to check if the recording sheets can be stacked in the bin 4bP. If YES in S2, the bin 4bP is determined in S3, and it is then checked in S13 if unrecorded recording sheets are present. If YES in S13, the received image data are printed out in step S4. However, if it is determined in S13 that unrecorded recording sheets are not present, a memory reception is performed to hold image data in the image memory 1, and data indicating the number of recording sheets is stored in the data memory 6 in correspondence with the held image data, in S7.

If it is determined in S2 that the recording sheets cannot be stacked in the bin 4bP, the flow advances to S5 to similarly check if the recording sheets can be stacked in the bin 4b10. If YES in S5, the bin 4b10 is determined in S6, and the flow advances to S13 to execute the same processing as described above.

On the other hand, if NO in S5, the flow advances to S7 to perform a memory reception for holding image data in the image memory 1 without printing them out. In this case, data indicating the number of recording sheets is stored in the data memory 6 in correspondence with the held image data.

If it is determined in S1 that P>M, the flow advances to S8. The value M is incremented by one in S8, and if it is determined in S9 that M=10, the flow advances to S5 to check if the recording sheets can be stacked in the bin 4b10. On the other hand, if it is determined in S9 that M≦9, the flow advances to S10 to check based on the contents of the data memory 6 if recording sheets are stacked in a bin 4bM (M=2 to 9). If YES in S10, the flow returns to S8 to similarly check the next bin.

On the other hand, if NO in S10, it is checked in S11 if the number P of recording sheets exceeds the maximum number of stackable sheets of this bin. If it is determined in S11 that the number P of recording sheets exceeds the maximum number of stackable sheets of this bin, since the recording sheets cannot be stacked in this bin, the flow advances to S5 to check if the recording sheets can be stacked in the bin 4b10. On the other hand, if it is determined in S11 that the recording sheets are stackable in the bin, the bin 4bM is determined in S12, and the flow advances to S13 to execute the same processing as described above.

The user determined value U is an integer ranging from 1 to 9 set by the key operation on the operation unit (not shown). A case will be exemplified below wherein U=3.

With the above-mentioned bin selection sequence, when the number of recording sheets for one communication is 1, a recording sheet is stacked in the bin 4b1; when the number of recording sheets for one communication is 2, recording sheets are stacked in the bin 4b2; and when the number of recording sheets for one communication is 3, recording sheets are stacked in the bin 4b3. Each of these bins can stack recording sheets for a plurality of communications. These bins will be referred to as recording sheet count sort bins hereinafter.

When the number of recording sheets for one communication is 4 or more, recording sheets are stacked in an empty one of the bins 4b4 to 4b9, and each of these bins stacks only recording sheets for one communication. Thus, recording sheets for a total of six communications can be stacked. These bins will be referred to as communication sort bins hereinafter.

The bin 4b10 stacks recording sheets which cannot be sorted when the number of sheets stacked in the recording sheet count sort bins has exceeded the maximum number of stackable sheets, or when recording sheets are stacked in all the communication sort bins. For this reason, this bin has a larger number of stackable sheets than other bins, so that images can be printed out as much as possible even when a large number of images are received. When the number of sheets stacked in the bin 4b10 has exceeded the maximum number of stackable sheets, the memory reception is performed to hold image data in the image memory 1, and a message for urging a user to remove recording sheets from the bins and to start a print-out operation is displayed on a display unit.

When a microswitch (not shown) attached to each bin detects that recording sheets stacked in the bin are removed, the number of stacked sheets of the corresponding bin stored in the data memory 6 is reset to 0. When a user starts the print-out operation of memory received image data, the bin is selected in the sequence shown in FIG. 2, and the image data are printed out.

When the printer uses cut sheets as recording paper, image data which is transmitted as one page from the transmitting side must be divided into two or more pages by the receiving side if it is longer than the cut sheet. For this reason, the counter 3 counts the number of recording sheets upon recording without counting the number of received pages.

In the apparatus for performing the above-mentioned operation, the print-out control of image data which is memory-received due to failures such as the absence of recording sheets determined in S13, a bin-full state determined in S5, and the like will be described below.

Image data received in one communication are stored in a predetermined area of the image memory 1, and the start address of this predetermined area and the number P of recording sheets counted by the counter 3 are stored in a buffer of the data memory 6 in correspondence with the image data. Memory reception operations for a plurality of communications can be performed until the image memory 1 overflows or all the buffers of the data memory 6 are used.

Control upon printing out of memory received image data after unrecorded recording sheets are replenished or recorded recording sheets are removed from the bins will be described below.

Figure 3:
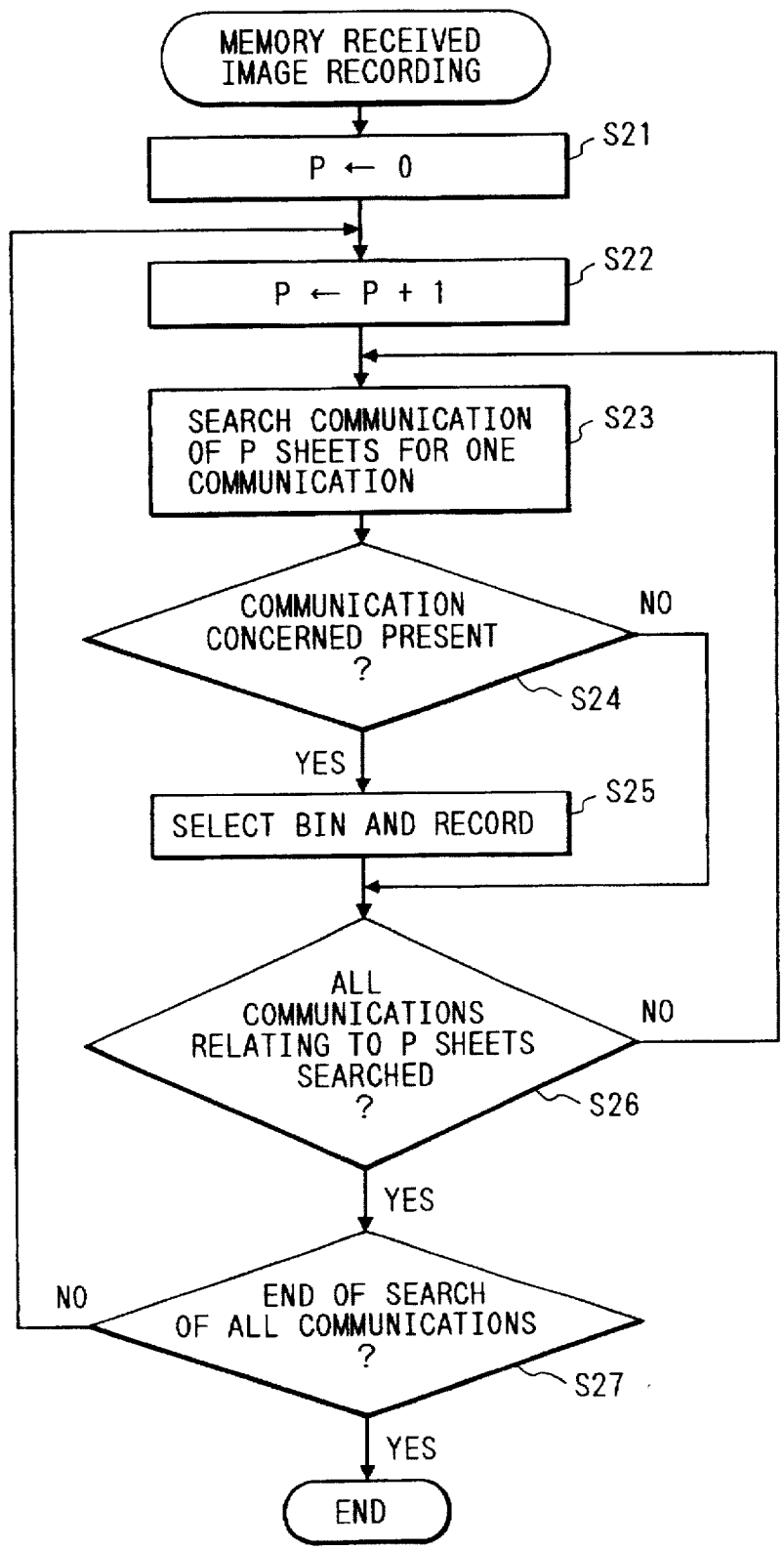
FIG. 3 is a flowchart showing the sequence of memory received image recording processing by a control unit.

FIG. 3 is a flowchart showing the memory received image data print-out processing in the control unit 5. Referring to FIG. 3, initialization is performed by setting 0 in P in S21. In S22, P is incremented by 1 (P=1). In S23, the data indicating the number of recording sheets stored in the data memory 6 is searched to check if a communication of P sheets (P=1) for one communication is present, i.e., image data to be stacked in the bin 4bP is present. If YES in S23, the flow advances to S25, and selection of the bin corresponding to the number of recording sheets and the print-out operation are performed.

The processing contents in S25 are the same as those in S1 to S4 or S1 to S7 in the flowchart shown in FIG. 2 described above. On the other hand, image data to be recorded can be read out from the image memory 1 on the basis of the start address stored in the data memory 6.

If it is determined in S23 that a communication concerned is not present, the flow advances to S26. The processing in S23 to S26 is repeated until all the communications are searched for a communication of P sheets. If the search operation is completed for all the communications, the flow advances to S22 to increment P by one (P=2). Then, the processing in S22 to S27 is repeated until processing for all the communications is completed.

When the processing in S7 in FIG. 2 is performed in S25, and image data cannot be printed out, the image data in the image memory 1 and the corresponding buffer contents in the data memory 6 are held. Upon completion of the memory received image recording processing, in order to effectively use the image memory 1, the printed-out image data are deleted, image data which cannot be printed out are moved to another storage area, and the start address in the buffer of the data memory 6 is rewritten accordingly. As described above, when the memory received image data for a plurality of communications are to be printed out, image data to be stacked in the bin $4b1$ are searched and printed, and then, image data to be stacked in the bin $4b2$ next to the bin $4b1$ are searched and printed. In this manner, since image data are printed not in the order of receptions but in the order of bins, the shift amount of bins can be minimized, and the processing time can be shortened.

In this embodiment, the print-out operation is started from P=1. Of course, the print-out operation may be started from P=U (U is the user determined value). On the other hand, whether the print-out operation is started from P=1 or P=U may be determined depending on the bin position of the sorter at the beginning of the memory received image recording processing.

In this embodiment, the number of recording sheets for one communication is used as a sort condition. Alternatively, conditional sorting in units of transmission sources can be easily realized by discriminating the transmission sources on the basis of the transmitting side telephone numbers, ID data, and the like from the transmission sources. On the other hand, conditional sorting in units of reception destinations can also be easily realized by discriminating reception destinations on the basis of reception destination ID data from the transmission sources or the sub-address service of the exchange. When these applications are adopted, data of the bin to stack which is discriminated upon reception is stored in the data memory 6 in correspondence with image data, and the same processing as described above can be performed by searching bin data from P=1 in the print-out operation.

In this embodiment, a facsimile apparatus has been exemplified. Of course, the present invention can be similarly applied to a recording apparatus such as a printer of a computer terminal. In this case, bin data indicated by a computer is stored in the data memory 6, and the same processing as described above is performed.

According to the above-mentioned embodiment, when memory received image data are recorded while executing conditional sorting, the number of times of shift and the shift amount of the bins of the sorter can be minimized, and the recording operation can be completed within a short period of time.

Also, noise upon shift of the bins can be reduced, and factors that shorten the mechanical service life of the sorter can be eliminated.

Another embodiment of the present invention will be described below.

The hardware arrangement of this embodiment is the same as that of the above-mentioned embodiment, and a detailed description thereof will be omitted.

Figure 4:
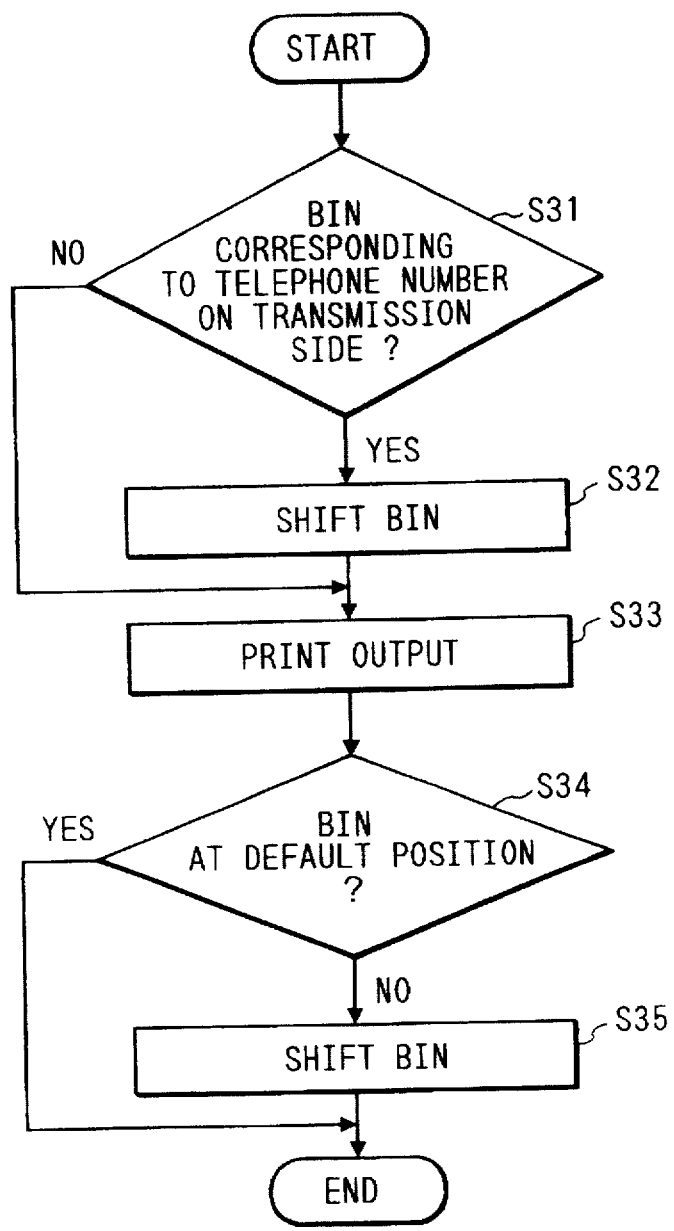
FIG. 4 is a flowchart showing the print output processing of a received document.

FIG. 4 is a flowchart showing the basic print-out processing of a received document by the control unit 5 in this embodiment.

In S31, the telephone number on the transmission side is checked, and it is checked if the telephone number is registered in a bin designation table (FIG. 13) in the data memory 6. If the telephone number is registered, bin data corresponding to the telephone number is temporarily stored in a permanent area SELBIN on the data memory 6, and the flow advances to S32; otherwise, the flow advances to S33.

In S32, the bin corresponding to the data stored in the permanent area SELBIN on the data memory 6 is shifted to the position of the delivery port of the printer. This processing is executed by the control unit 5. Thereafter, the flow advances to S33.

In S33, a received document is printed out. In S34, it is checked if the sorter bin is located at the default position after the end of the print operation. If YES in S34, the processing ends; otherwise, the flow advances to S35. In this case, data of the default pin is stored in the area SELBIN. Note that the default bin data is pre-stored in the permanent area on the data memory 6.

In S35, the sorter bin is returned to the default position. Note that the default position data is pre-stored in the data memory 6.

The table shown in FIG. 13 is the bin designation table, which defines the correspondences between the communication partner's telephone numbers and the bin numbers as print-out destinations. Note that a plurality of telephone numbers can be registered for one bin. This table is stored in the permanent area on the data memory 6.

Such a table is registered by the same processing as registration of abbreviated dials attained by a user's operation.

Processing executed when the number of sheets stacked in a bin reaches the number of stackable sheets and the bin is no longer available for output will be described below.

Figure 5:
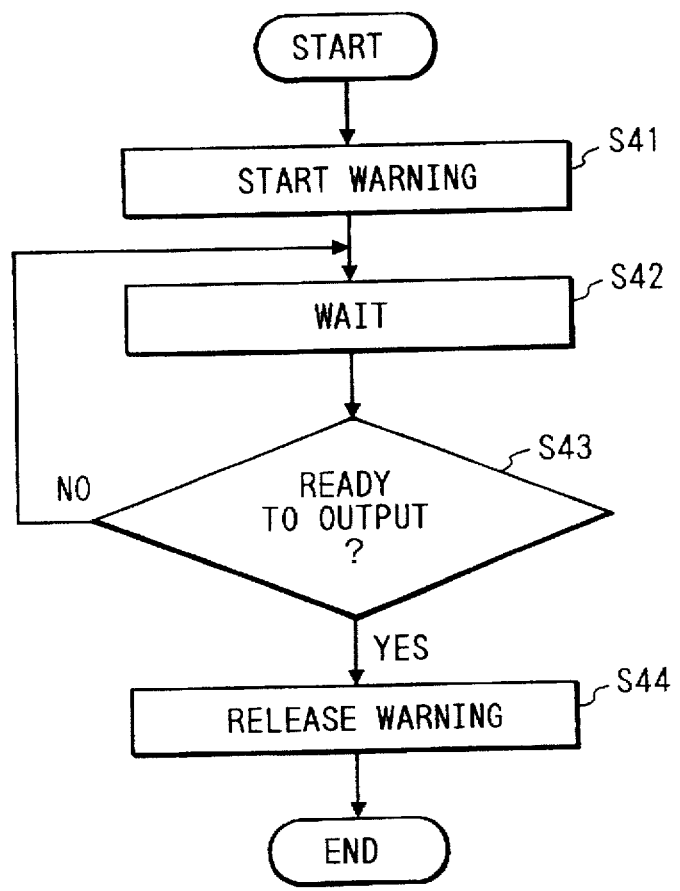
FIG. 5 is a flowchart showing the monitor processing of bins executed when the number of stackable sheets of each bin has been reached.

FIG. 5 is a flowchart showing the bin monitor processing executed when the number of sheets stacked in a given bin reaches the number of stackable sheets after the print operation.

In S41, a warning message indicating that the bin to which recording sheets are output cannot be used is displayed on the operation unit. For example, a message "remove recording sheets on bin 1" is displayed.

In S42, wait processing for waiting a predetermined period of time is performed. If there is another processing to be executed, the processing can be executed during this processing.

It is checked in S43 if the recording sheets in the bin which is being monitored are removed, and the bin is ready to output after an elapse of the predetermined period of time in S42. If YES in S43, the flow advances to S44; otherwise, the wait processing in S42 is executed again.

In S44, the message displayed in S41 is deleted, i.e., the warning is released.

Figure 6:
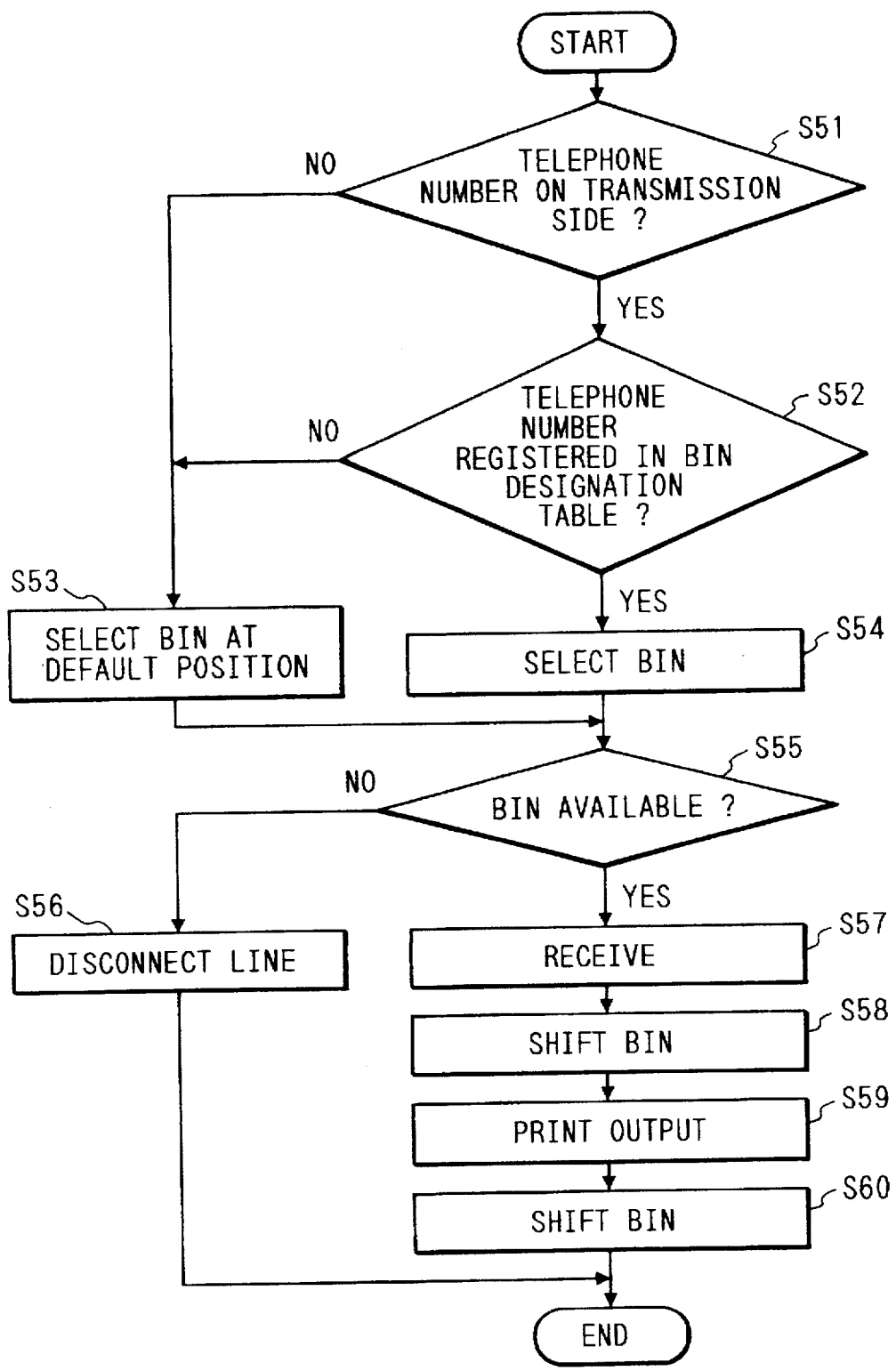
FIG. 6 is a flowchart showing the processing executed upon reception of an image when a given bin is not ready to output.

Processing executed when an image is received from another facsimile apparatus while a given bin is not ready to output will be described below with reference to FIG. 6.

Note that the constituting elements of the apparatus are the same as those in the above embodiment (FIG. 1), and a description thereof will be omitted.

In S51, it is checked if a telephone number is received. If YES in step S51, the flow advances to S52; otherwise, the flow advances to S53.

When the telephone number of the communication partner's apparatus is received in S51, it is checked in S52 if the telephone number is registered in the bin designation table stored in the data memory 6. If YES in S52, the flow advances to S53; otherwise, the flow advances to S54.

In S53, the default bin is selected, and its data is temporarily stored in the permanent area SELBIN on the data memory 6. Note that the data of the default bin is pre-stored in the data memory 6.

In S54, the bin designation table is checked to select the bin corresponding to the telephone number of the communication partner's apparatus, and its data is temporarily stored in the permanent area SELBIN on the data memory 6.

After these processing operations, it is checked in S55 if the bin corresponding to the data stored in the permanent area SELBIN on the data memory 6 is ready to use. If YES in S55, the flow advances to S57; otherwise, the flow advances to S56.

In S56, the line is disconnected, thus ending the processing.

In S57, a reception is performed, and processing up to disconnection of the line is performed. In S58, the bin corresponding to the data stored in the permanent area SELBIN on the data memory 6 is shifted to the position of the delivery port of the printer 2.

In S59, the received document data is printed out. After printing is finished, the default bin is shifted to the position of the delivery port of the printer 2 in S60.

Figure 7:
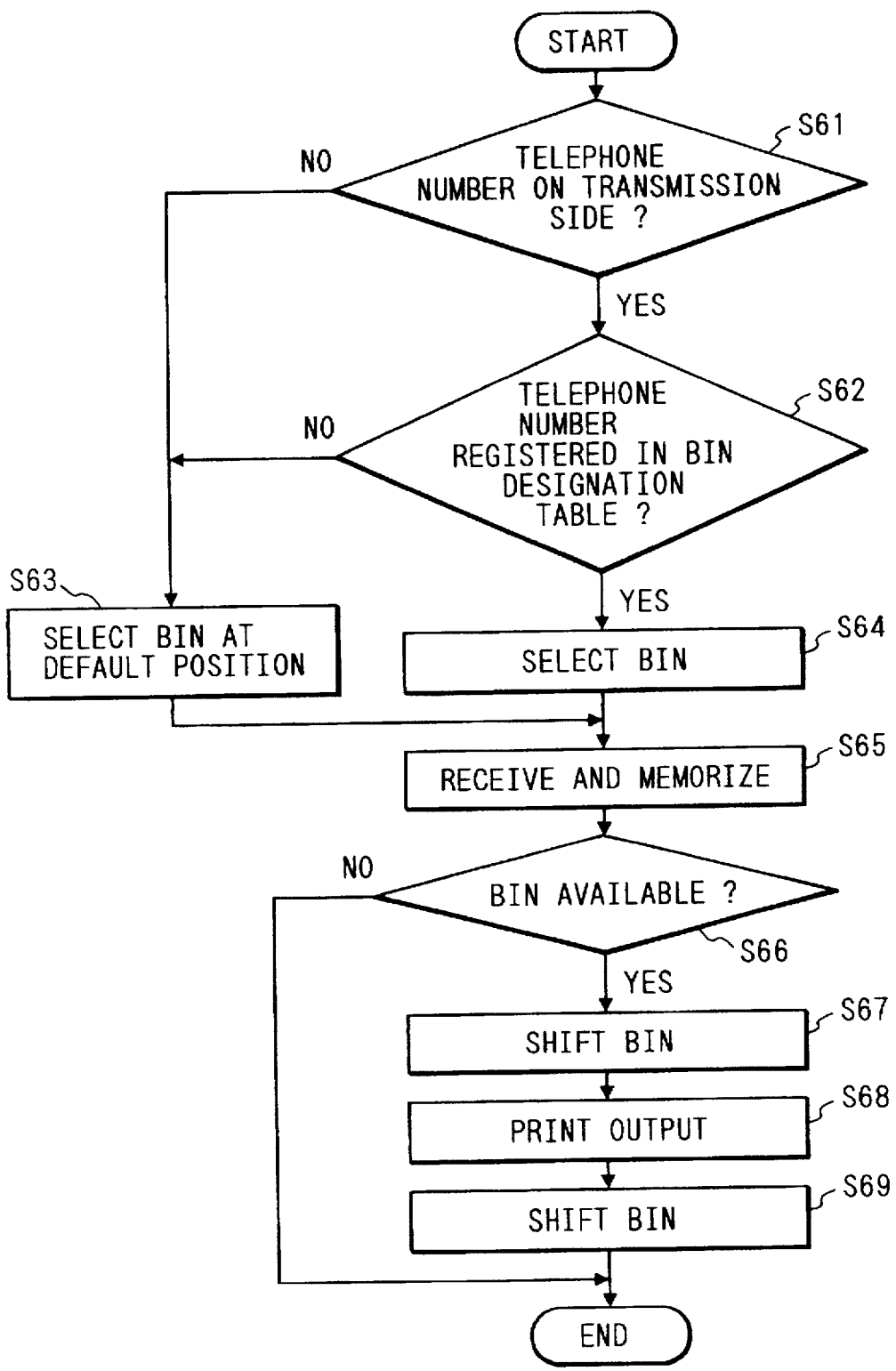
FIG. 7 is a flowchart showing the processing executed upon reception of an image when a given bin is not ready to output.

Another processing executed when an image is received from another facsimile apparatus while a given bin is not ready to output will be described below with reference to FIG. 7.

Note that the constituting elements of the apparatus are the same as those in the above embodiment (FIG. 1), and a description thereof will be omitted.

The processing in S61 to S64 is the same as that in S51 to S54. In S65, document data is received, and is temporarily stored in the image memory 1.

In S66, it is checked if the bin corresponding to the data stored in the area SELBIN on the data memory 6 is ready to use. If YES in S66, the flow advances to S67; otherwise, the processing ends.

In S67, the bin corresponding to the data stored in the area SELBIN on the data memory 6 is shifted to the position of the delivery port of the printer 2. In S68, the received document data stored in the image memory 1 is printed out.

In S69, the default bin is shifted to the position of the delivery port of the printer 2.

Figure 8:
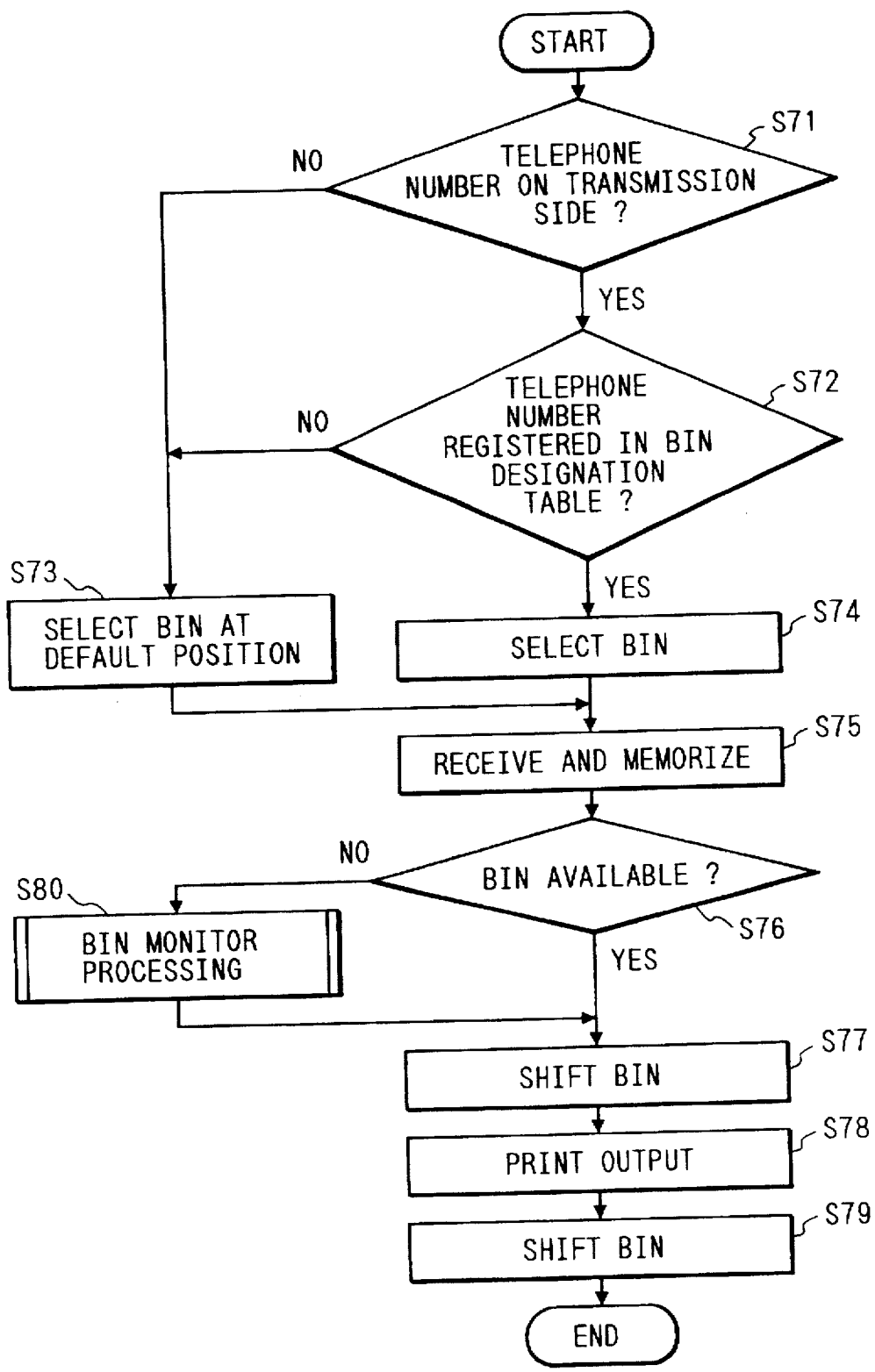
FIG. 8 is a flowchart showing the processing executed upon reception of an image when a given bin is not ready to output.

Processing is executed when document data stored in the image memory 1 since the sorter cannot be used is output will be described below with reference to FIG. 8. In this embodiment, document data is printed out when the sorter recovers a usable state from an unusable state in the sorter monitor processing.

Note that the constituting elements of the apparatus are the same as those in the above embodiment (FIG. 1), and a description thereof will be omitted.

The processing in S71 to S75 is the same as that in S61 to S65. In S76, it is checked if the bin corresponding to the data stored in the area SELBIN on the data memory 6 is ready to use. If YES in S76, the flow advances to S77; otherwise, the flow advances to S80.

The processing in S77 to S79 is the same as that in S67 to S69.

In S80, the sorter monitor processing in S41 to 10 S44 is executed. The flow then advances to S77 and the subsequent steps.

Figure 9:
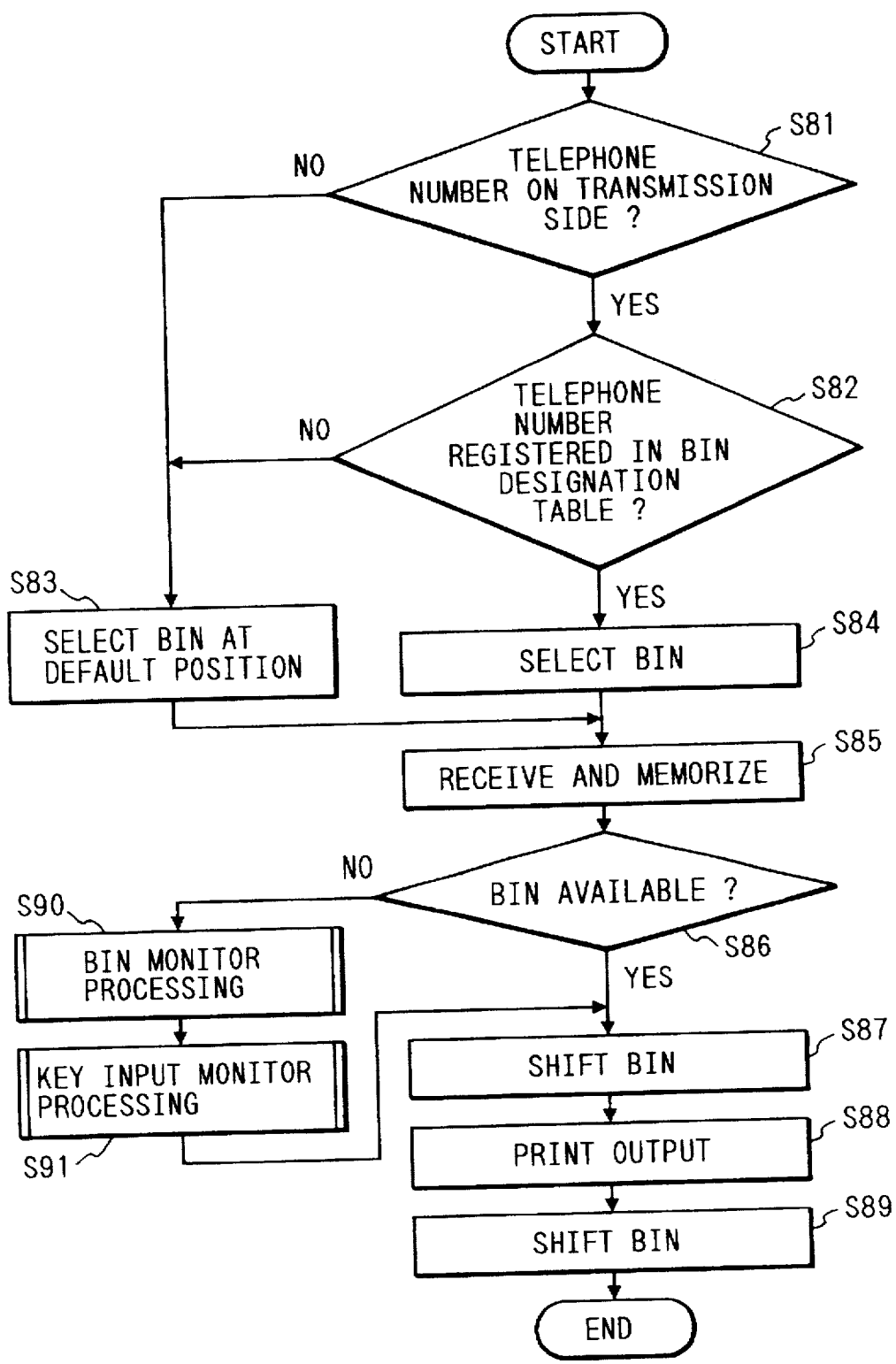
FIG. 9 a flowchart showing the processing executed upon reception of an image when a given bin is not ready to output.

Processing executed when document data stored in the image memory 1 since the sorter cannot be used is output will be described below with reference to FIG. 9. In this embodiment, the print-out operation is started in response to a key operation of the user after the sorter becomes ready to use.

Note that the constituting elements of the apparatus are the same as those in the above embodiment (FIG. 1), and a description thereof will be omitted.

The processing in S81 to S90 is the same as that in S71 to S80. In S91, processing to be executed when the bin as the output destination becomes ready to use by the bin monitor processing in S90 is executed. In this case, the processing shown in FIG. 10 is executed.

Figure 10:
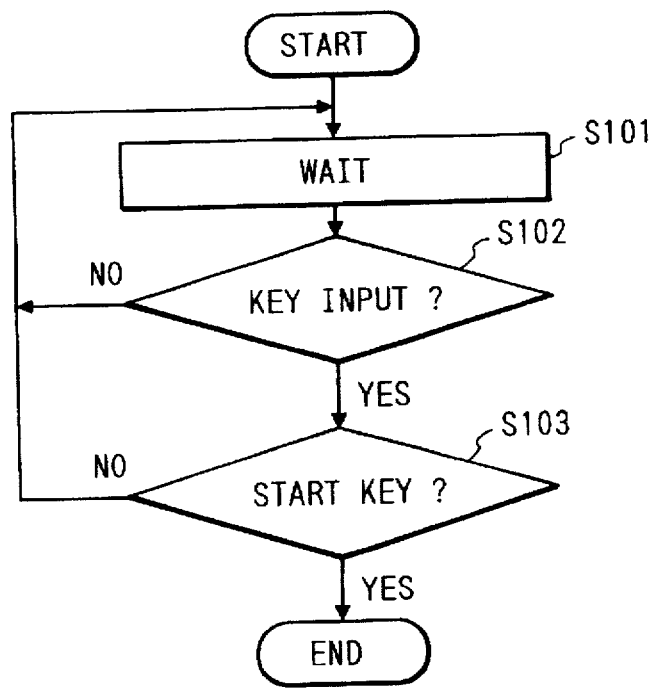
FIG. 10 is a flowchart showing the key input monitor processing for monitoring an input operation of keys arranged on an operation unit.

More specifically, FIG. 10 is a flowchart showing the key input monitor processing for monitoring the input operation of keys arranged on the operation unit.

In S101, wait processing for waiting a predetermined period of time is performed. If a key input is detected during this processing, the key input is stored in a key input buffer on the data memory 6.

In S102, it is checked if a key input is detected in S101. If YES in S102, the flow advances to S103; otherwise, the flow returns to S101.

If it is determined in S103 that the input key in S101 is the start key, the processing ends; if it is determined in S103 that the input key in S101 is another key, the key buffer is cleared, and the flow returns to S101 to execute the wait processing again.

Figure 11:
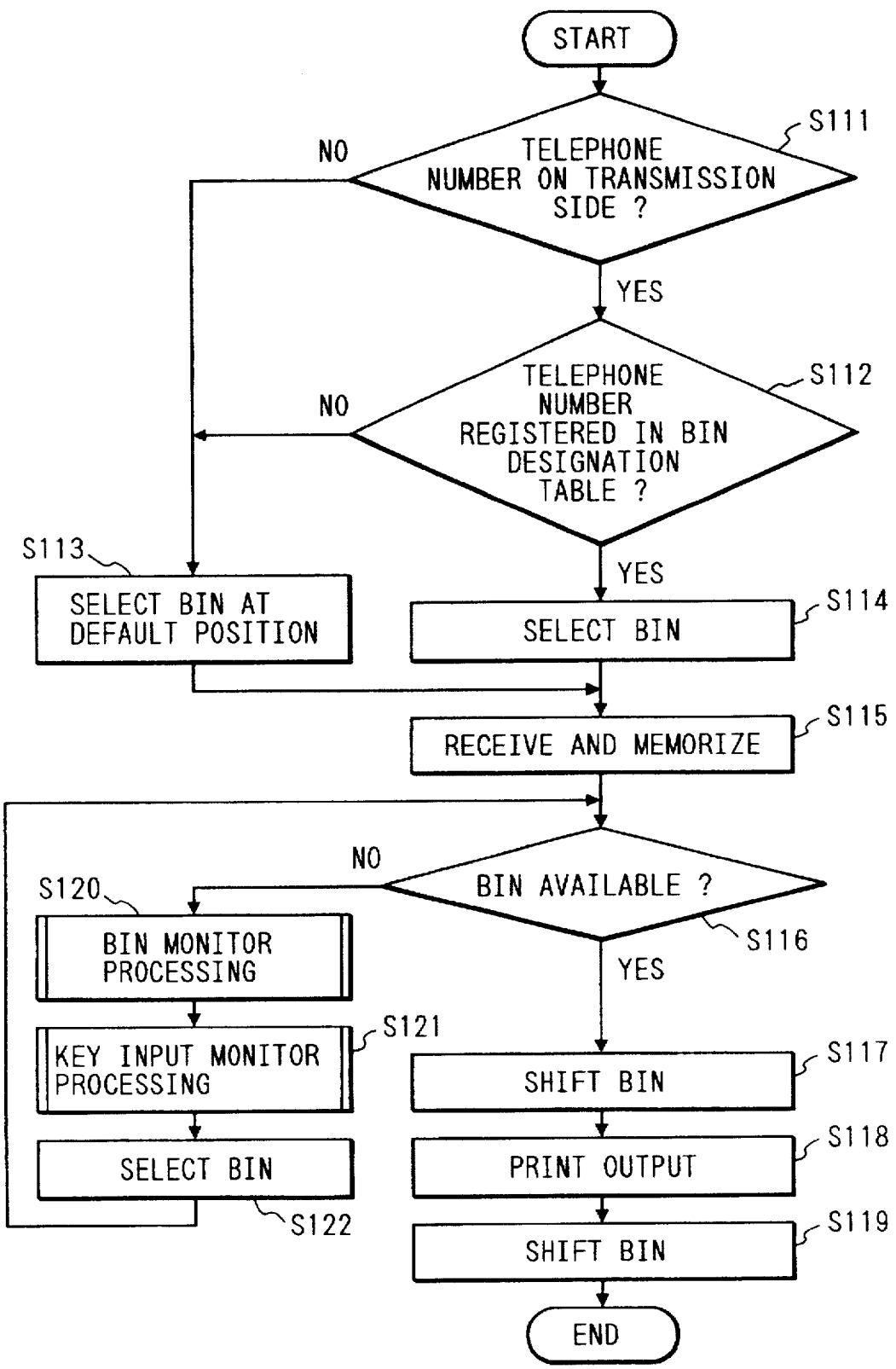
FIG. 11 is a flowchart showing the processing executed upon reception of an image when a given bin is not ready to output.

Processing is executed when document data stored in the image memory 1 since the sorter cannot be used is output will be described below with reference to FIG. 11. In this embodiment, another bin is selected in response to a key operation of the user, and a print-out operation is started.

Note that the constituting elements of the apparatus are the same as those in the above embodiment (FIG. 1), and a description thereof will be omitted.

The processing in S111 to S120 is the same as that in S81 to S90.

Figure 12:
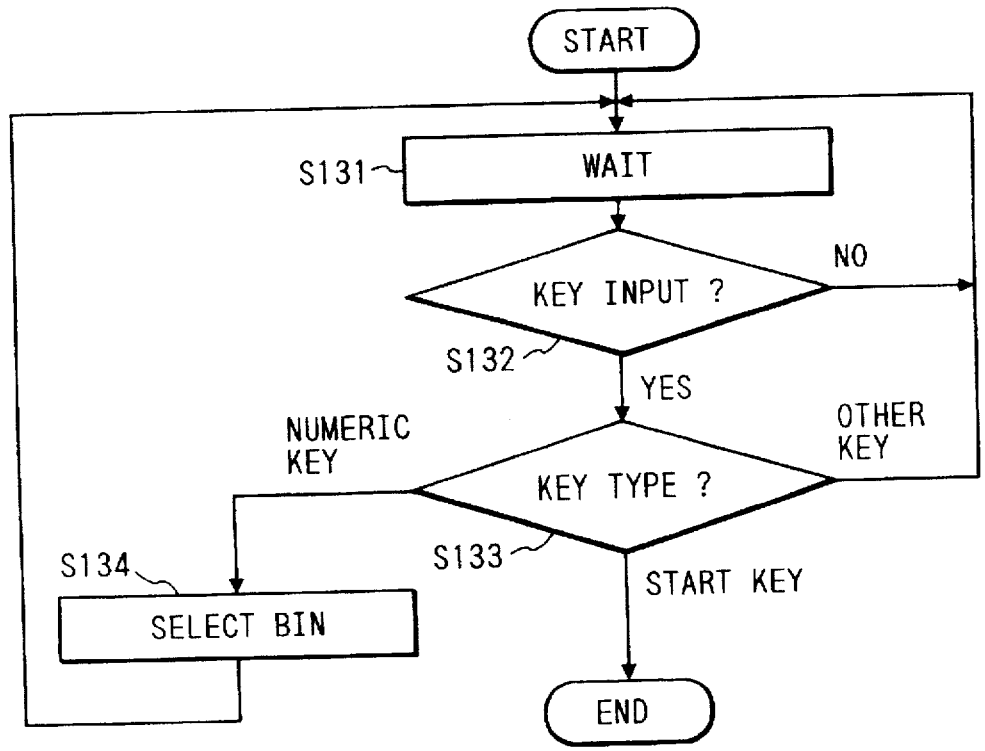
FIG. 12 is a flowchart showing the key input monitor processing for monitoring an input operation of keys arranged on an operation unit.

In S121, processing to be executed when the bin as the output destination becomes ready to use by the bin monitor processing in S120 is executed. In this case, the processing shown in FIG. 12 is executed. Processing in S122 is the same as that in S114.

More specifically, FIG. 12 is a flowchart showing the key input monitor processing for monitoring the input operation of keys arranged on the operation unit.

The processing in S131 and S132 are the same as that in S101 and S102. In S133, the flow branches depending on the type of input key. For example, if the input key is a numeric key, the flow advances to S134, and the same processing as in S114 is executed. On the other hand, if the input key is the start key, the flow advances to S122. If the input key is another key, the flow returns to S131.

In each of the above embodiments, a bin is selected in correspondence with each communication partner. Alternatively, a bin may be selected on the basis of the size or type of recording sheet, the recording time zone, or the like.

What is claimed is:

1. An image recording apparatus comprising:

recording means for recording an input image on a sheet;

stacking means for sorting the sheet by stacking the sheet recorded by said recording means in one of a plurality of stacking units;

determination means for determining a stacking unit in which the sheet is to be stacked;

discrimination means for discriminating if said recording means is ready to record;

first memory means for storing an input image when said discrimination means discriminates that said recording means is not ready to record; and second memory means for storing stacking unit information indicating the stacking unit determined by said determination means in correspondence with the input image stored in said first memory means.

2. An apparatus according to claim 1, wherein when the input image stored in said first memory means is recorded, said stacking means stacks the sheet in the stacking unit in accordance with the stacking unit information stored in said second memory means.

3. An apparatus according to claim 1, wherein said stacking means stacks the sheet in each of the stacking units by shifting the stacking unit to a position near a sheet delivery portion of said recording means, and said recording means records a plurality of groups of input images stored in said first memory means in an arrangement order of the stacking units on the basis of the stacking unit information stored in said second memory means.

4. An apparatus according to claim 3, wherein the plurality of stacking units are arranged in a vertical direction.

5. An apparatus according to claim 1, wherein said determination means determines the stacking unit on the basis of the number of sheets on which a group of input images are to be recorded.

6. An apparatus according to claim 1, wherein said determination means changes the stacking unit in units of inputs.

7. An apparatus according to claim 1, wherein the input image is a facsimile-received image.

8. An apparatus according to claim 7, wherein said determination means determines the stacking unit on the basis of a transmission source.

9. An apparatus according to claim 7, wherein said determination means determines the stacking unit on the basis of a destination.

10. An apparatus according to claim 7, wherein said determination means changes the stacking unit in units of communications.

11. An apparatus according to claim 1, wherein the input image is an image input from a computer.

12. An apparatus according to claim 1, wherein said determination means determines the stacking unit in accordance with an instruction from the computer.

13. An apparatus according to claim 1, wherein said discrimination means discriminates that said recording means is not ready to record when unrecorded sheets are absent.

14. An image recording method comprising the steps of:
recording an input image on a sheet using a recording unit;

sorting the sheet by stacking the sheet recorded in the recording step in one of a plurality of stacking units;

determining a stacking unit in which the sheet is to be stacked;

discriminating if the recording unit is ready to record;

storing, in a first memory an input image when it is discriminated in the discrimination step that the recording unit is not ready to record; and storing, in a second memory, stacking unit information indicating the stacking unit determined in the determining step in correspondence with the input image stored in the memory.

15. A method according to claim 14, wherein the stacking step includes the step of stacking the sheet in the stacking unit in accordance with the stacking unit information stored in the second memory when the input image stored in the first memory is recorded.

16. A method according to claim 14, wherein the stacking step includes the step of stacking the sheet in each of the stacking units by shifting the stacking unit to a position near a sheet delivery portion of the recording unit, and the recording step includes the step of recording a plurality of groups of input images stored in the first memory in an arrangement order of the stacking units on the basis of the stacking unit information stored in the second memory.

17. A method according to claim 16, wherein the plurality of stacking units are arranged in a vertical direction.

18. A method according to claim 14, wherein the determinating step includes the step of determining the stacking unit on the basis of the number of sheets on which a group of input images are to be recorded.

19. A method according to claim 14, wherein the determinating step includes the step of changing the stacking unit in units of inputs.

20. A method according to claim 14, wherein the input image is a facsimile-received image.

21. A method according to claim 20, wherein the determinating step includes the step of determining the stacking unit on the basis of a transmission source.

22. A method according to claim 20, wherein the determination step includes the step of determining the stacking unit on the basis of a destination.

23. A method according to claim 20, wherein the determinating step includes the step of changing the stacking unit in units of communications.

24. A method according to claim 14, wherein the input image is an image input from a computer.

25. A method according to claim 14, wherein the determinating step includes the step of determining the stacking unit in accordance with an instruction from the computer.

26. A method according to claim 14, wherein it is discriminated in the discriminating step that the recording unit is not ready to record when unrecorded sheets are absent.

* * * * *

UNITED STATES PATENT AND TRADEMARK OFFICE
CERTIFICATE OF CORRECTION

PATENT NO. : 5,734,480
DATED : March 31, 1998
INVENTOR(S) : KAWAMURA ET AL.

It is certified that error appears in the above-identified patent and that said Letters Patent is hereby corrected as shown below:

<u>Column 4</u>

Line 44, "Referring" should read --¶ Referring--.

<u>Column 10</u>

Line 28, "minating" should read --mination--.
    Line 32, "minating" should read --mination--.
    Line 37, "minating" should read --mination--.
    Line 43, "minating" should read --mination--.
    Line 48, "minating" should read --mination--.

Signed and Sealed this

Eighth Day of September, 1998

*Attest:*

BRUCE LEHMAN

*Attesting Officer*      *Commissioner of Patents and Trademarks*